United States Patent [19]

Taki et al.

[11] Patent Number: 5,690,551
[45] Date of Patent: Nov. 25, 1997

[54] IMAGE DISPLAY DEVICE, IMAGE DISPLAY SYSTEM, AND PROGRAM CARTRIDGE USED THEREWITH

[75] Inventors: Yoshihiro Taki; Masafumi Sakashita; Satoshi Matsumura, all of Kyoto, Japan

[73] Assignee: Nintendo Co., Ltd., Kyoto, Japan

[21] Appl. No.: 555,748

[22] Filed: Nov. 9, 1995

[30] Foreign Application Priority Data

Nov. 11, 1994 [JP] Japan ................... 6-278181

[51] Int. Cl.$^6$ ............................................ G09G 3/02
[52] U.S. Cl. .................................... 463/32; 345/9
[58] Field of Search .............................. 463/30, 31, 32, 463/33; 359/40, 38; 345/7, 8, 9

[56] References Cited

U.S. PATENT DOCUMENTS 5,422,653  6/1995  Maguire, Jr. ................... 345/9
5,493,427  2/1996  Nomura et al. ................. 359/40

*Primary Examiner*—George Manuel
*Attorney, Agent, or Firm*—Nixon & Vanderhye P.C.

[57] ABSTRACT

A body device 2 has left and right display units disposed adjacent to both eyes of a user. A program cartridge 4 is detachably provided to this body device 2. The game cartridge 4 stores program data and image data for eye width/visibility adjusting picture display. The body device 2 reads the program from the program cartridge 4 and executes it immediately after the power is turned on or at the time when the game is temporarily stopped, and reads and refers to the image data to display eye width/visibility adjusting pictures in the left and right display units. Then, the user operates an eye width adjusting lever 201 and a visibility adjusting lever 202 on the upper surface of the body device 2 while watching the eye width/visibility adjusting pictures displayed in the left and right display systems. The space set between the left and right display units is thus adjusted. The visibility adjustment in the left and right display units is also achieved.

7 Claims, 15 Drawing Sheets

BACK-UP MEMORY 42

WORK MEMORY 222

IMAGE WORK MEMORY 225

IMAGE MEMORY 224

(a) LEFT SCREEN   (b) RIGHT SCREEN (c) VIRTUAL IMAGE SEEN BY BOTH EYES

EYE WIDTH / VISIBILITY ADJUSTING PICTURE
DISPLAY PROGRAM MEMORY 229

5,690,551

IMAGE DISPLAY DEVICE, IMAGE DISPLAY SYSTEM, AND PROGRAM CARTRIDGE USED THEREWITH

BACKGROUND OF THE INVENTION

1. Field of the Invention

The present invention relates to image display devices, and more particularly to a device for displaying images independently to both eyes of a user.

2. Description of the Background Art

Conventional devices for displaying images at a distance adjacent to the eyes of a user include the display system developed by Reflection Technology in the United States, for example. (Refer to Japanese Patent Laying-Open No. 2-42476, Japanese Patent Laying-Open No. 2-63379) This display system is sold under the commercial name of "The Private Eye". This conventional display system includes an LED array with a plurality of LED (light emitting diode) elements arranged in a vertical column, a lens unit for forming an enlarged virtual image of the LED array and a mirror in which a reflected image of the enlarged virtual image can be observed. The mirror is reciprocatively moved in a certain angle range and display data is provided to the LED array sequentially for each column in synchronization with the reciprocative movement of the mirror, and the columns of light emitted from the LED array are reflected and scanned by the reciprocatively moving mirror. As a result, a two-dimensional image is transmitted to the eyes of an observer.

The conventional display system is small and light, but it is mainly used with one eye. Accordingly, one may consider combining a pair of, left and right display units to observe the image with both eyes, but the space set between the left and right display units must be adjusted because the width between the eyes differs slightly for every observer. Ideally, the optical axis of the left and right eyes and the center of the left and right display screens must coincide with each other. If the space set between the left and right display units is too broad or too narrow as compared with the eye width of the observer, it will make the eyes too tired. Especially, when the image display device is applied to something like an electronic game device which is continuously used for a long time, the eyestrain will be accumulated, so that it is preferred to reduce the eyestrain as much as possible. One may also consider providing images displayed in the left and right display units with parallax to display stereoscopic images, but if the width between the eyes of the observer does not coincide with the space set between the left and right display units, the parallax angle gets out of a desired angle and the observer's sense of distance in the depth direction of a displayed object will differ from the distance intended by a designer.

Furthermore, in the image display device described above, visibility adjustment (focus adjustment) must also be made by changing the space between the left and right LED elements and the lens units, but this may interfere with the adjustment of the space set between the left and right display units.

SUMMARY OF THE INVENTION

Accordingly, it is an object of the present invention to provide an image display device and an image display system capable of easily adjusting a space or a width between left and right display units according to the eye width of a user.

Another object of the present invention is to provide a program cartridge connected to the image display device of the present invention to be used.

A first aspect of the present invention is directed to an image display device for independently displaying images to both eyes of a user, which includes:

- a pair of display units disposed on the left and the right being adjacent to the both eyes of the user;
- a width adjusting mechanism adjustably holding a space between the pair of display units;
- an eye width adjusting picture displaying program storing portion for storing a program for displaying an eye width adjusting picture;
- an eye width adjusting picture displaying image data storing portion for storing image data for displaying the eye width adjusting picture; and
- a display controlling portion for executing the program stored in the eye width adjusting picture displaying program storing portion and referring to the image data stored in the eye width adjusting picture displaying image data storing portion to cause the left and right display units to display the eye width adjusting picture, wherein the space between the left and right display units is adjusted by operating the width adjusting mechanism on the basis of a visually recognized state of the eye width adjusting picture displayed in the left and right display units.

In the above-described first aspect, the display control portion executes the program stored in the eye width adjusting picture displaying program storing portion and refers to the image data stored in the eye width adjusting picture displaying image data storing portion to display an eye width adjusting picture in the left and right display units. The space between the left and right display units is adjusted by operating the width adjusting mechanism according to the visually recognized state of the eye width adjusting picture displayed in the left and right display units. This way, the space set between the left and right display units can easily be adjusted to coincide with the eye width of a user.

According to the first aspect, in a preferred embodiment, in the left display unit, a first figure is displayed in the vicinity of the left end in the eye width adjusting picture and a second figure is displayed in the vicinity of the right end in the eye width adjusting picture. In the right display unit, the third figure is displayed in the vicinity of the left end in the eye width adjusting picture and the fourth figure is displayed in the vicinity of the right end in the eye width adjusting picture. The first and third figures are disposed so that they are not superposed on each other, and the second and fourth figures are also disposed so that they are not superposed on each other. When such left and right eye width adjusting pictures are seen through both eyes, one of the first through fourth figures can not be seen if the space set between the left and right display units does not coincide with the eye width of the user. Hence, the space between the left and right display units is adjusted so that all the first through fourth figures are visible. The first and second figures may be coupled to each other in part, and similarly, the third and fourth figures may be coupled to each other in part.

According to the first aspect, in another preferred embodiment, a first figure is displayed in the vicinity of the center in the eye width adjusting picture in the left display unit. In the right display unit, a second figure is displayed in the vicinity of the center in the eye width adjusting picture. The first and second figures are disposed so that they are not superposed on each other. When such left and right eye width adjusting pictures are seen through both eyes, if the space set between the left and right display units does not agree with the eye width of a user, the first figure and the second figure are seen as if they are shifted in position in the left and right direction. Accordingly, the space between the left and right display units is adjusted so that the positions of the first and second figures match in the left and right direction.

Furthermore, according to the first aspect described above, in still another preferred embodiment, the program stored in the eye width adjusting picture displaying program storing portion is executed immediately after the power is turned on and the space between the left and right display units is adjusted.

Furthermore, according to the first aspect described above, each of the left and right display units is constituted so that a light emitting element array having a plurality of light emitting elements regularly arranged along a first direction is supplied with display data sequential for each column and each light emitting element is selectively display-driven, an enlarged virtual image of the light emitting element array formed by a lens system is reflected by a mirror to make it visible to eyes of a user, and the mirror is reciprocatively moved in a certain angle range by a mirror driving portion to scan the enlarged virtual image in a second direction almost perpendicular to the first direction to project a two-dimensional planar image to the eyes of the user, for example.

A second aspect of the present invention is directed to an image display system including an image display device body and a program cartridge attachably/detachably connected to this image display device body. A program and image data for displaying an eye width adjusting picture are stored in the program cartridge. The image display device body executes the program stored in the program cartridge and refers to the image data to display the eye width adjusting pictures in the left and right display units. Then, the space between the left and right display units is adjusted according to the visually recognized state of the eye width adjusting pictures displayed in the left and right display units.

A third aspect of the present invention is directed to a program cartridge attachably/detachably connected to the image display device body. This program cartridge stores a program and image data for displaying an eye width adjusting picture. The image display device body executes the program stored in the program cartridge and refers to the image data to display the eye width adjusting picture in the left and right display units.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flow chart showing the eye width/visibility adjusting operation executed in the embodiment of the present invention when power is turned on.

DESCRIPTION OF THE PREFERRED EMBODIMENTS

Human beings can see two pictures with parallax separately with left and right eyes and fuse the two pictures in the brain to sense the depth. An electronic game device of an embodiment described hereinafter is configured to display stereoscopic images to an observer by utilizing the image fusion action.

Generally speaking, a display screen for the game includes two general kinds of displayed components. The first components include displayed objects having relatively large display areas and which do not move finely on the screen, such as mountains, rivers, forests, sky, buildings, etc. The second components include displayed objects having relatively small display areas and which move finely and rapidly on the screen, such as a hero character, enemies, bullets, missiles, etc. In the electronic game device of the embodiment described hereinafter, displayed objects which belong to the first displayed components are called backgrounds (referred to as BG, hereinafter) and displayed objects which belong to the second displayed components are called objects (referred to as OBJ, hereinafter).

Figure 1:
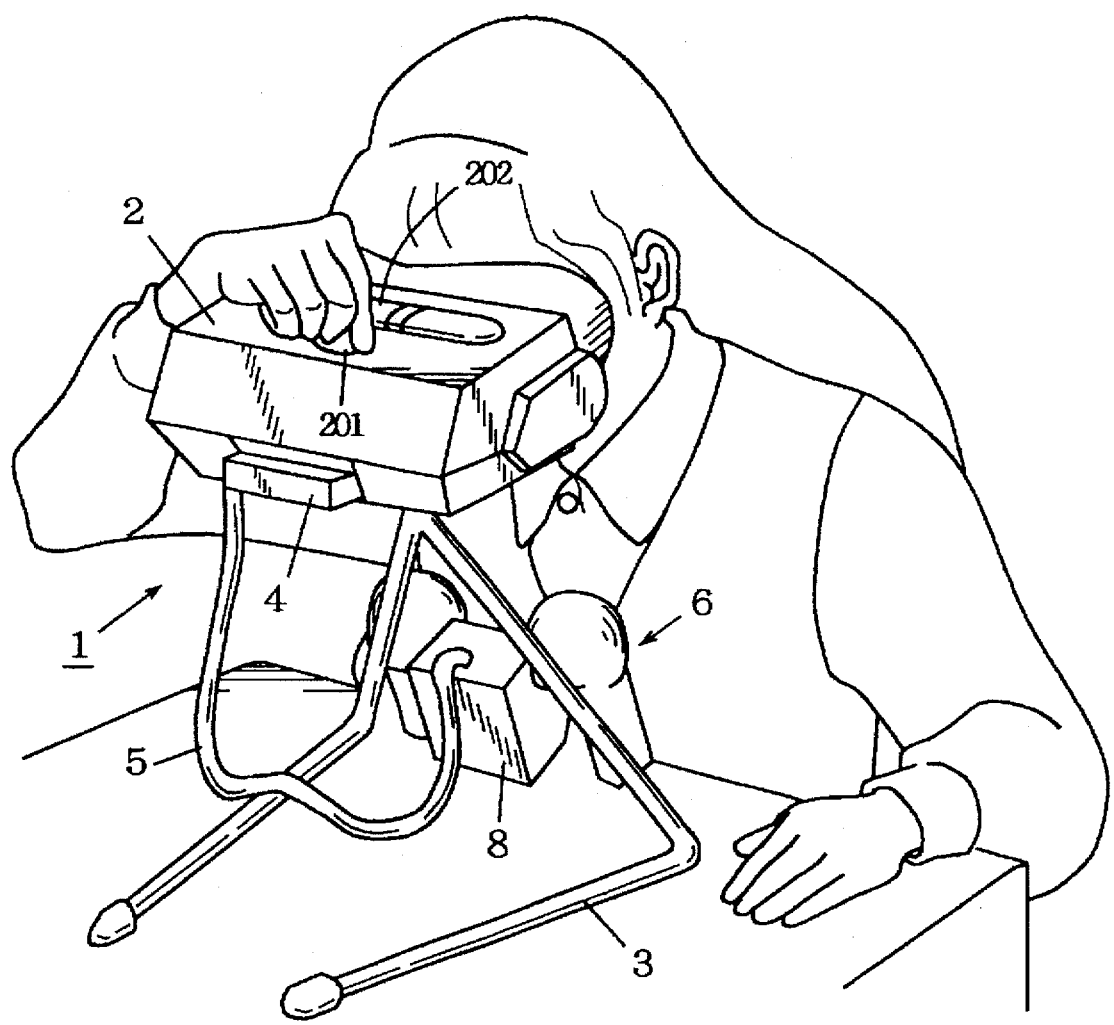
FIG. 1 is a perspective view showing an electronic game device in use according to an embodiment of the present invention.
Figure 2:
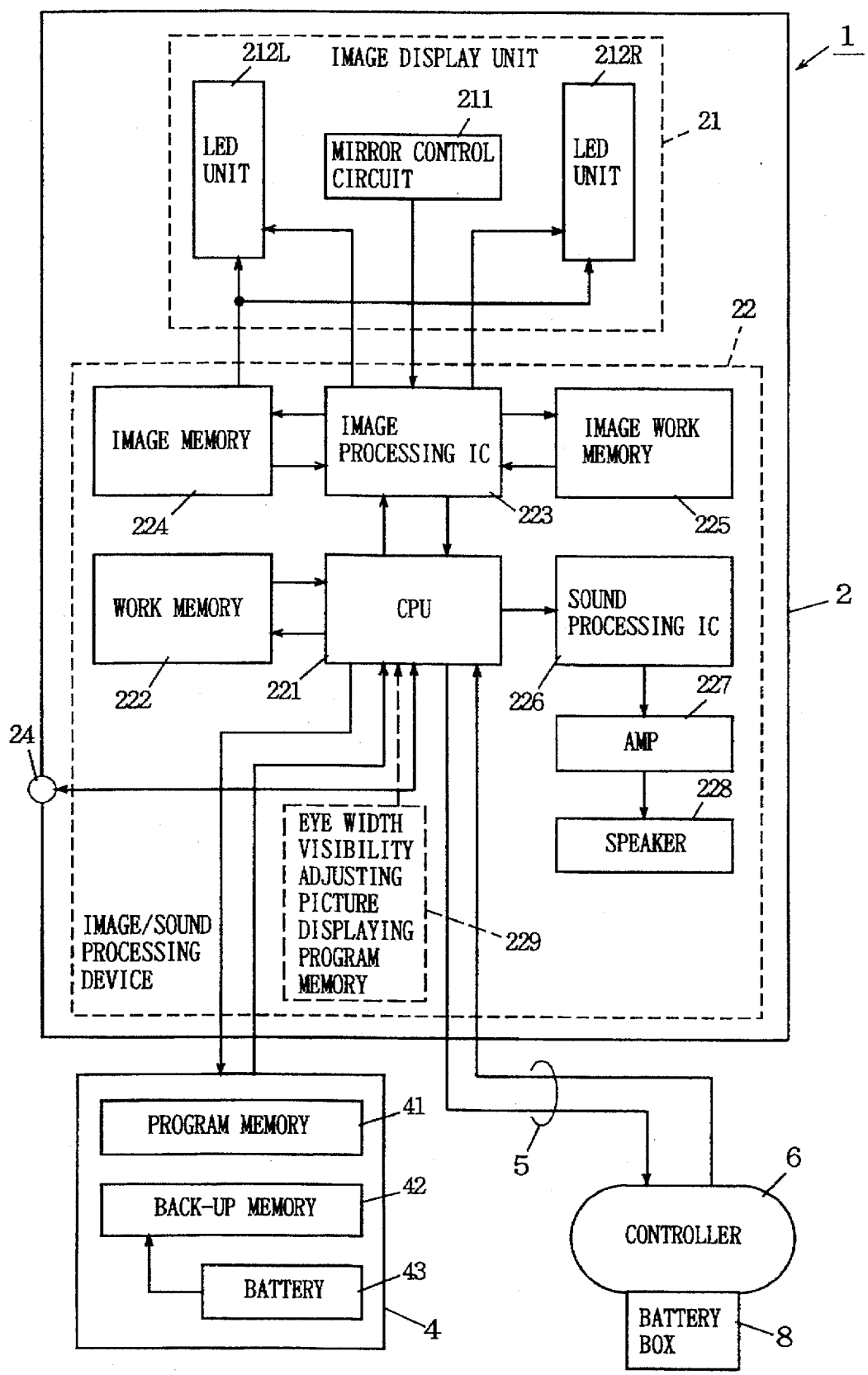
FIG. 2 is a block diagram showing the electric structure of the electronic game device according to the embodiment of the present invention.

FIG. 1 is a perspective view showing an electronic game device in use according to one embodiment of the present invention. FIG. 2 is a block diagram showing the electronic structure of the game device shown in FIG. 1. Referring to FIG. 1 and FIG. 2, the structure of this embodiment is described below.

An electronic game device 1 includes a console body device 2, a support stand 3 coupled to the bottom of the body device 2, a program cartridge 4 attached to the body device 2 in an attachable/detachable manner, and a controller 6 connected to the body device 2 through a cord 5. The console body device 2 is supported on a desk or the like by the support stand 3. A player looks into the supported body device 2 to see a game image. A rotary eye width adjusting lever 201 and a slidable visibility adjusting lever 202 are provided on the upper surface of the body device 2.

Figure 3:
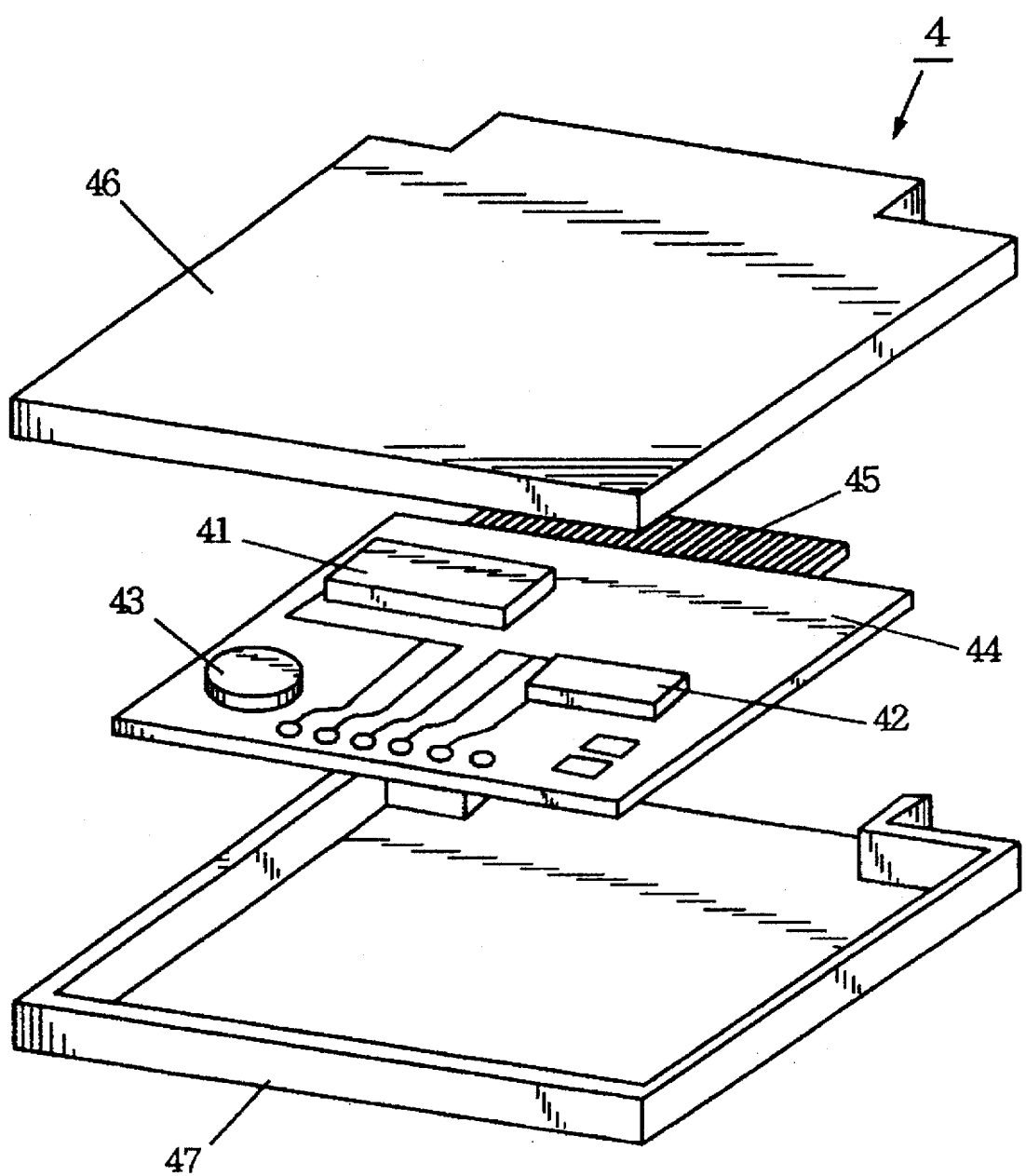
FIG. 3 is an exploded perspective view showing an example of the structure of the program cartridge 4 in FIG. 1.

The program cartridge 4 includes a program memory 41 formed of a non-volatile storage medium, such as ROM and CD-ROM, a backup memory 42 formed of a rewritable storage element, such as RAM, and a battery 43 formed of a lithium battery or the like. As shown in FIG. 3, the program memory 41, the back-up memory 42 and the battery 43 are packaged on a substrate 44 having a terminal 45, for example. The substrate 44 is accommodated in a case formed of an upper housing 46 and a lower housing 47.

Preferably, the controller 6 is equipped with a battery (cell) box 8 which is attachable and detachable. This cell box 8 has a cell accommodated therein for supplying driving power to the body device 2. Accordingly, the electronic game device of this embodiment can be used in places where no commercial power is supplied (outdoors, on vehicles, etc.) A connecting jack for introducing external commercial power may be provided to the cell box 8 and the commercial power may be supplied to the body device 2 when it is not driven by a cell.

The console body device 2 includes an image display unit 21, an image/sound processing device 22, and a transfer port 24. The image/sound processing device 22 includes a CPU 221, a work memory 222, an image processing IC 223, an image memory 224, an image work memory 225, a sound IC 226, an amp 227 and a speaker 228. The CPU 221 executes a game program stored in the program memory 41 of the program cartridge 4. The transfer port 24 is connected to the CPU 221 to enable communication with another electronic game device.

Figure 4:
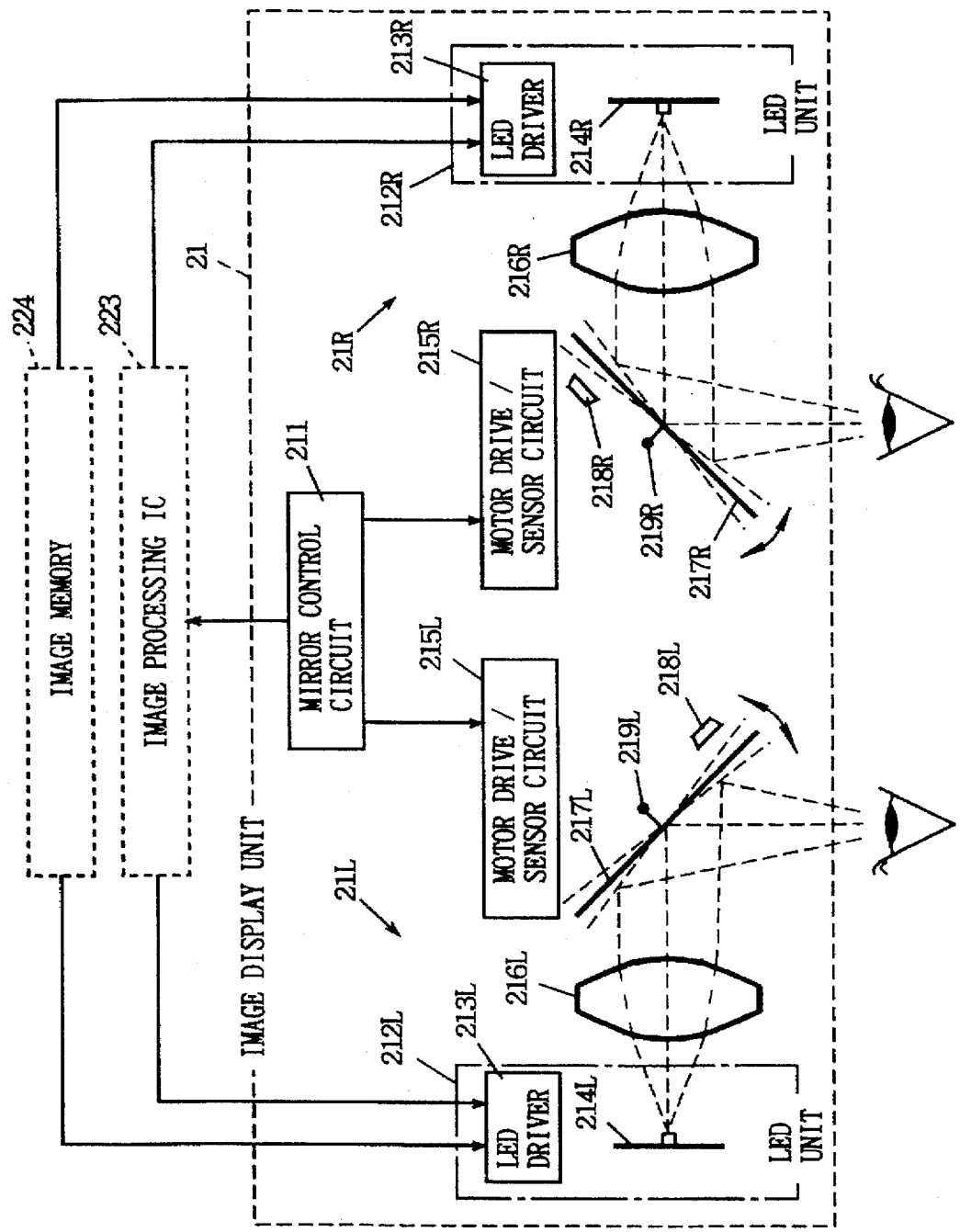
FIG. 4 is a diagram showing more detailed structure of the image display unit 21 in FIG. 2.

The image display unit 21 includes a pair of, left and right, display systems 21L and 21R and a mirror control circuit 211, as shown in detail in FIG. 4. The display systems 21L and 21R specifically include a pair of, left and right, motor drive/sensor circuits 215L and 215R, a pair of, left and right, lens systems 216L and 216R, a pair of, left and right, mirrors 217L and 217R and a pair of, left and right, voice coil motors 218L and 218R. The LED units 212L and 212R include LED drivers 213L and 213R and LED arrays 214L and 214R, respectively.

The image display unit 21 displays one picture with 384 dots in the X-axis direction (in the horizontal direction with respect to the visual field) and 224 dots in the Y-axis direction (in the vertical direction with respect to the visual field). Accordingly, the LED arrays 214L and 214R are formed of 224 LEDs placed in a row in the Y-axis direction, respectively. Light beams in columns emitted from the LED arrays 214L and 214R impinge upon the mirrors 217L and 217R through the lens systems 216L and 216R, respectively, and are reflected by the mirrors 217L and 217R, and then enter the left and right eyes of the player. The mirror control circuit 211 drives the voice coil motors 218L and 218R, using the motor drive/sensor circuits 215L and 215R. Thus, the mirrors 217L and 217R reciprocatively pivot in a certain period about the supporting points 219L and 219R. As a result, the light beam in columns emitted from each LED array is scanned in the horizontal direction. The image processing IC 223 transfers image data for 384 columns from the image memory 224 to the LED driver 213L or 213R while the mirror 217L or 217R turns once. Accordingly, the player recognizes an image formed of 384 (transverse)×224 (vertical) dots due to the after image phenomenon.

Figure 5:
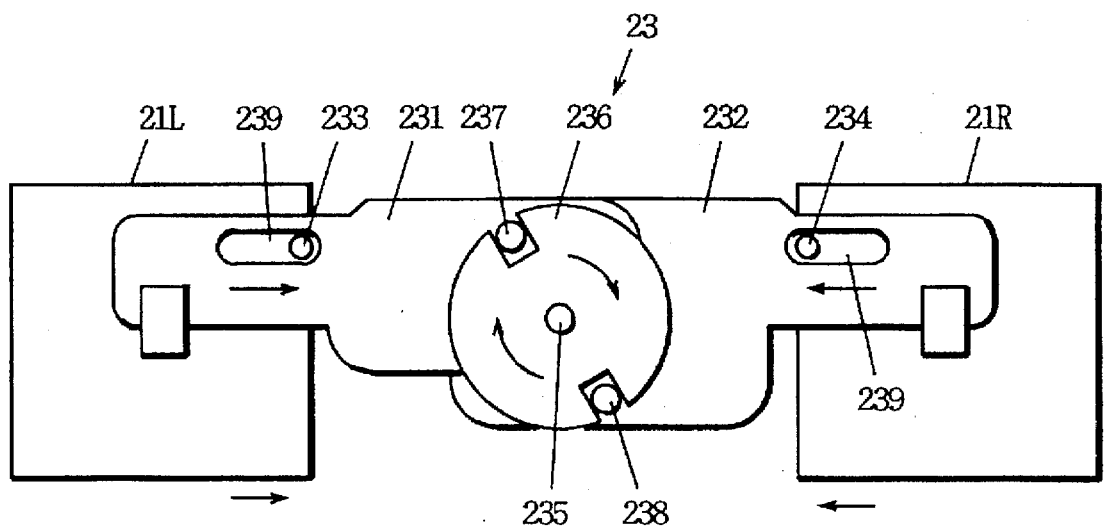
FIG. 5 is a diagram showing an example of a width adjusting mechanism.

To adjust the space between the display systems 21L and 21R, a width (or space) adjusting mechanism 23 shown in FIG. 5 is provided in relation with the display systems 21L and 21R. In the width adjusting mechanism 23, two sliders 231 and 232 are supported slidably in the left and right direction by guide shafts 233 and 234 protruding on its upper surface. On one end of the slider 231, a discoid adjusting knob 236 is turnably supported by a shaft 235. The adjusting knob 236 has notches formed at two facing portions on its periphery, and the notches are engaged with engaging projections 237 and 238 affixed to the sliders 231 and 232, respectively. The display systems 21L and 21R are hung down on the outer (on the open end sides) ends of the sliders 231 and 232, respectively. With this structure, when the adjusting knob 234 is turned in the direction shown in the figure (clockwise), the sliders 231 and 232 are slid toward the center in the lateral direction by the linkage action of the respective notch engaging projections 237 and 238, and the space between the display systems 21L and 21R is adjusted to be shorter. Accordingly, the space or width between the display systems 21L and 21R can be adjusted in a width almost twice the length of the long holes 239 of the sliders 231 and 232 which guide the guide shafts 233 and 234. According to an experiment by the inventor of this application, if it has an adjustable range of about 21 mm, it can cover the maximum range of the width between two eyes which differs among races and individuals.

Figure 6:
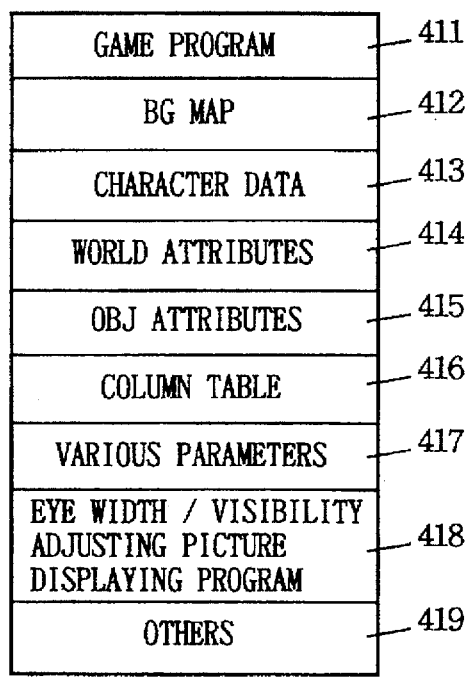
FIG. 6 is a diagram showing a memory map of the program memory 41 in FIG. 2.

FIG. 6 is a diagram schematically showing the structure of the program memory 41 in FIG. 2. In FIG. 6, the program memory 41 includes areas 411–419. The area 411 stores a game program. BG maps are stored in the area 412. In the BG maps, data for character codes (codes corresponding to character data shown below) for BG display are described. A plurality (tens of thousands, for example) of character data are stored in the area 413. Each character data is 8×8 dot bit map data, and by combining which character data all BG's and OBJ's are represented. One dot is represented with 2 bits to represent a 4-gradation display. World attributes are stored in the area 414. The electronic game device of this embodiment forms one image by superposing 32 planes of worlds on the maximum. The world attributes are attribute information necessary to draw each world. OBJ attributes are stored in the area 415. The OBJ attributes are attribute information necessary to draw OBJ's. A column table is stored in the area 416. This column table includes timing data described therein for correcting unevenness of dot pitch in the X-axis direction caused by sine-wave vibration of the mirrors 217L and 217R in the image display unit 21. Stored in the area 417 are various parameters necessary to execute the game (parameters used in special display processing, for example). An eye width/visibility adjusting picture display program, which characterizes this invention, is stored in the area 418. This eye width/visibility adjusting picture display program is a program for displaying pictures necessary to adjust the eye width and the visibility when the power is turned on or in pause (temporary stop) after the game is started. The area 419 stores other data which are necessary to execute the game.

Figure 7:
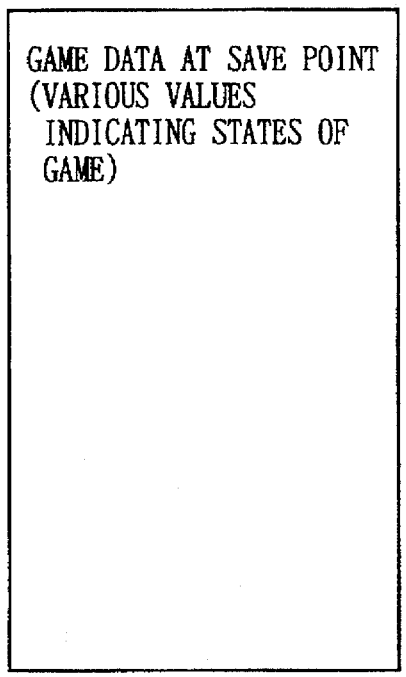
FIG. 7 is a diagram showing a memory map of the backup memory 42 in FIG. 2.

FIG. 7 is a diagram schematically showing structure of the back-up memory 42 in FIG. 2. In FIG. 7, game data (various values indicating states of the game) at each save point is stored in the back-up memory 42. The back-up memory 42 is formed of RAM and is backed up by the battery 43.

Accordingly, the game data stored in the back-up memory 42 is held even after the power of the body device 2 is turned off.

Figure 8:
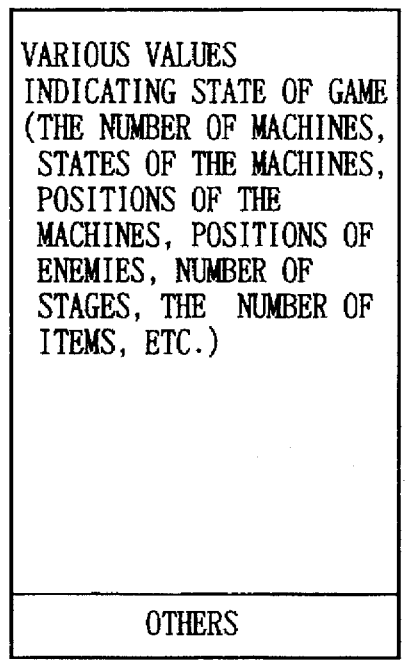
FIG. 8 is a diagram showing a memory map of the work memory 222 in FIG. 2.

FIG. 8 is a diagram schematically showing the structure of the work memory 222 in FIG. 2. In FIG. 8, the work memory 222 stores various values indicating states of the game (the number of machines on the player's side, states of the player's machines, positions of the machines on the player's side, positions of enemies, a number of stages, the number of items, etc.) and other data.

Figure 9:
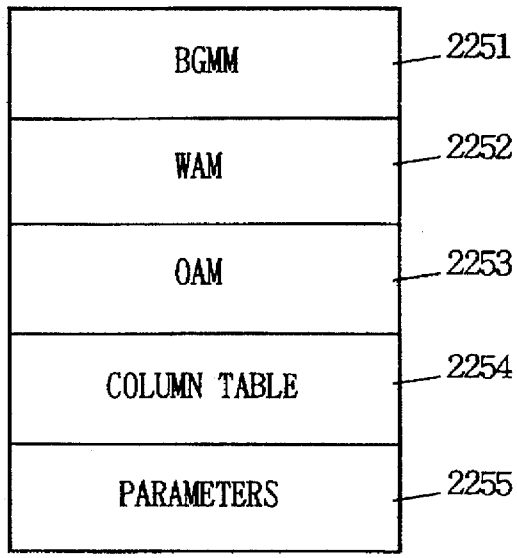
FIG. 9 is a diagram showing a memory map of the image work memory 225 in FIG. 2.

FIG. 9 is a diagram schematically showing the structure of the image work memory 225 in FIG. 2. In FIG. 9, the image work memory 225 includes areas 2251–2255. The area 2251 is used as a BGMM (BG map memory) for storing BG maps selectively read from the area 412 of the program memory 41 (refer to FIG. 6). The area 2252 is used as a WAM (World Attribute Memory) for storing world attributes for 32 worlds. The area 2253 is used as an OAM (OBJ Attribute Memory) for storing OBJ attributes selectively read from the area 415 of the program memory 41. Stored in the area 2254 is a column table read from the area 416 in the program memory 41. Stored in the area 2255 are various parameters necessary to execute the game (e.g., parameters used in special display modes, such as H-bias, affine, etc.)

Figure 10:
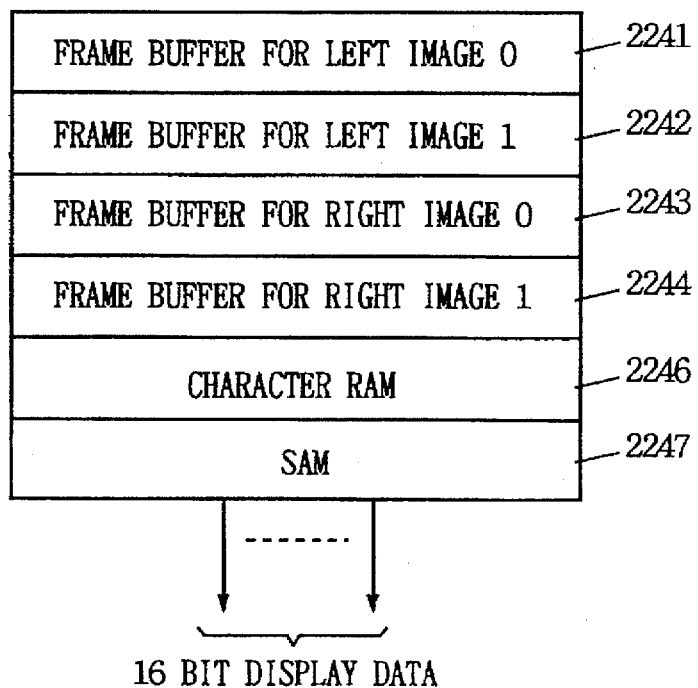
FIG. 10 is a diagram showing a memory map of the image memory 224 in FIG. 2.

FIG. 10 is a diagram schematically showing the structure of the image memory 224 in FIG. 2. In FIG. 10, the image memory 224 includes areas 2241–2247. The area 2241 is used as a frame buffer (0) for the left image. The area 2242 is used as a frame buffer (1) for the left image. The area 2243 is used as a frame buffer (0) for the right image. The area 2244 is used as a frame buffer (1) for the right image. Each frame buffer stores display data for one picture (display data of 384×224 dots, each bit having a depth of 2 bits). The area 2246 is used as a character RAM. Stored in the character RAM are the maximum of 2048 character data read from the area 413 of the program memory 41 (refer to FIG. 6). The area 2247 is used as a SAM (Serial Access Memory). Display data stored in each frame buffer are transferred to the SAM 2247 by every four vertical columns (for every 224×4×2=1792 bits). The SAM 2247 outputs accumulated display data to the image display unit 21 by every 16 bits (8 dots).

In this embodiment, the BG and OBJ are displayed by different methods, considering differences in nature between the BG and the OBJ. First, the BG is displayed by cutting a picture in a necessary area out of a BG map developed in the BGMM 2251 (refer to FIG. 9) and sticking the cut-out picture in an arbitrary position on the display screen. It is possible to cut out a picture in units of one dot in a range from the minimum of 1 (transverse)×8 (vertical) dots to the maximum of 384 (transverse)×224 (vertical) from the GB map. The coordinates at which cutting-out is started can also be specified in units of one dot in both X and Y coordinates. The OBJ is formed by freely combining 8×8 dots character blocks. In other words, by well controlling display coordinates of selected character blocks, the selected character blocks are connected on the display screen. The maximum number of characters usable on one display screen is 1024. The 1024 characters are selected from the 2048 characters registered in the character RAM 2246 (refer to FIG. 10) of the image memory 224 and used.

Further, in this embodiment, generated OBJ images and BG images are provided with parallax to stereoscopically display the OBJ's and BG's. That is to say, the OBJ is provided with parallax by displaying the same picture shifted by a distance corresponding to the given quantity of parallax in the opposite directions along the X axis (horizontally) on the left and right screens. The OBJ is provided with parallax by displaying the same picture cut out from the BG map while sifted by a distance corresponding to the given quantity of parallax in the opposite directions along the X axis (horizontally) on the screens on both sides. Furthermore, the BG is also provided with parallax by cutting out left and right pictures from the BG map while being shifted in the opposite directions along the X axis by a distance corresponding to the given quantity of parallax and displaying the two pictures at the same position on the screens on both sides.

Figure 11:
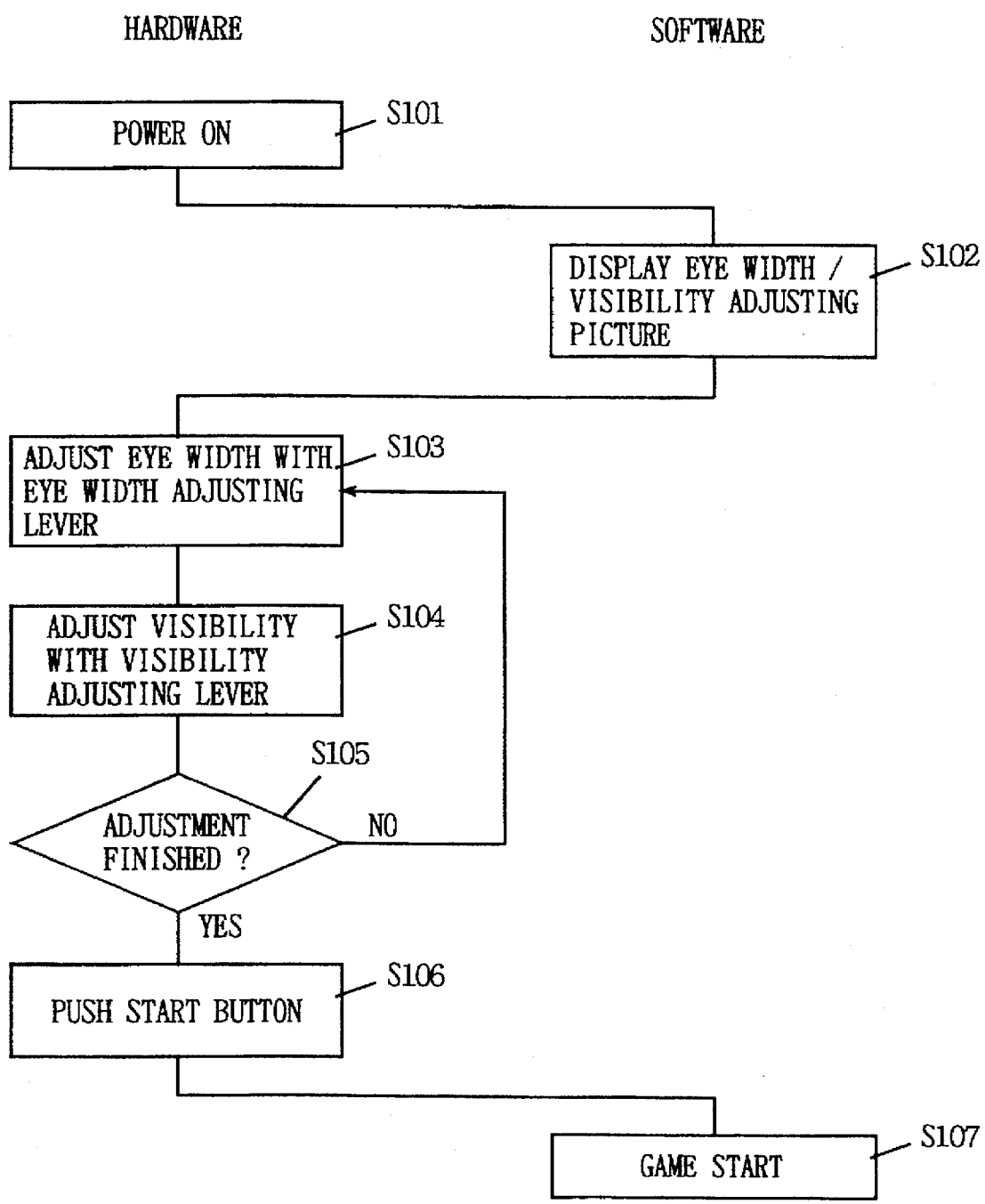
Figure 12:
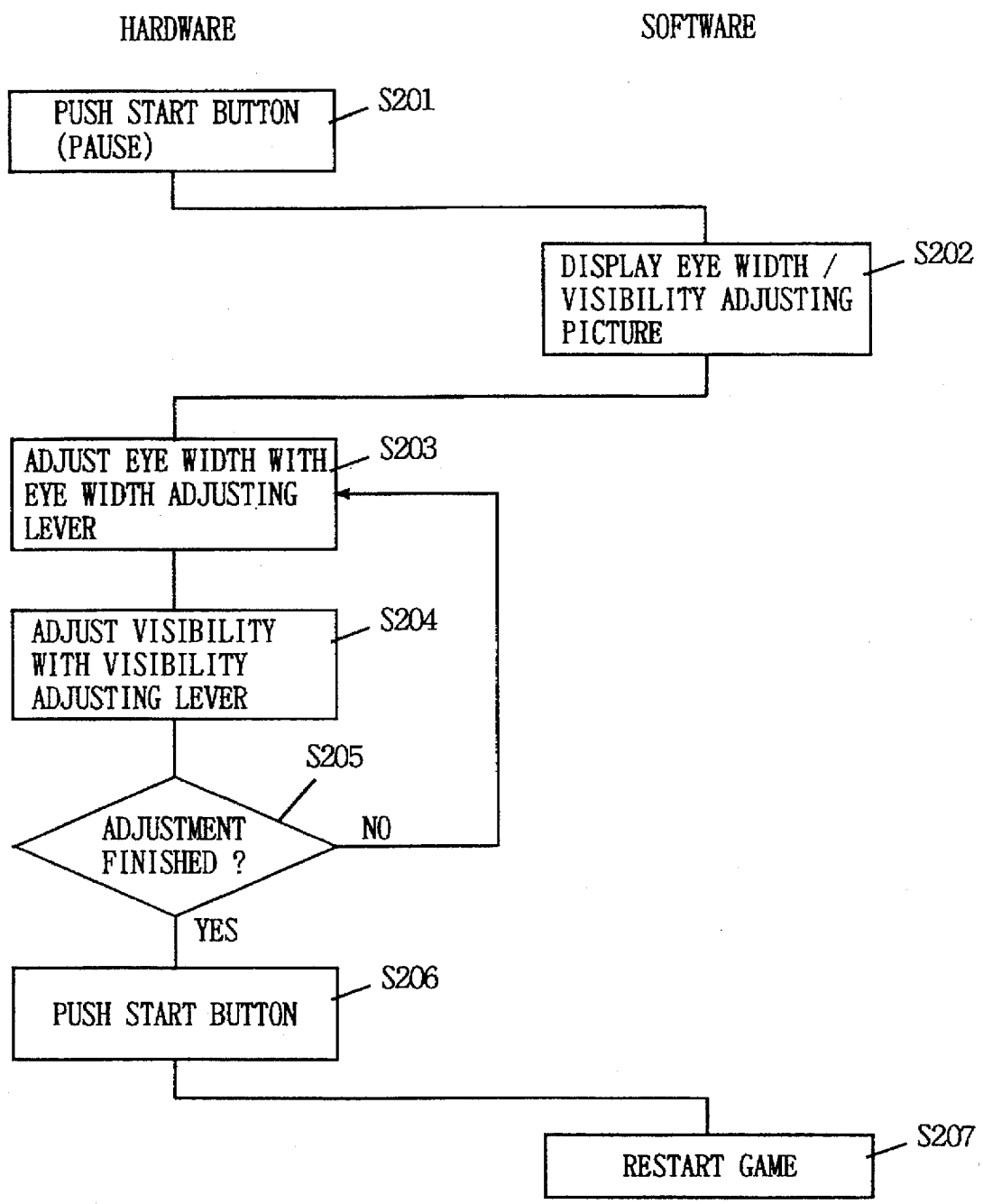
FIG. 12 is a flow chart showing the eye width/visibility adjusting operation executed in the embodiment of the present invention in pause.

FIG. 11 and FIG. 12 are flow chart showing the eye width/visibility adjusting operation in the above-described embodiment. Referring to FIG. 11 and FIG. 12, the eye width/visibility adjusting operation achieved in the above-described embodiment will now be described.

Figure 13:
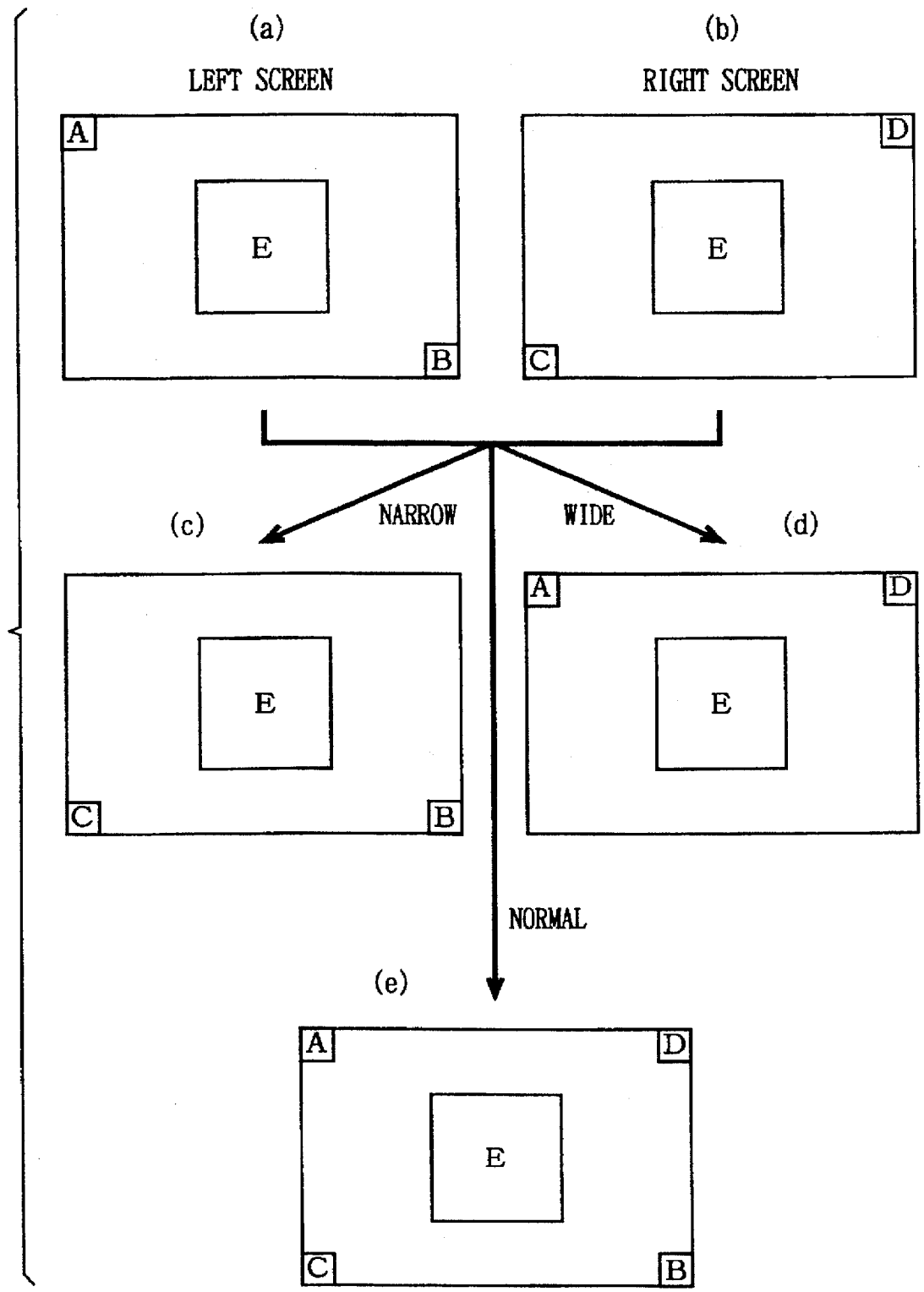
FIG. 13 is a diagram showing an eye width/visibility adjusting picture displayed in the embodiment of the present invention.

First, referring to FIG. 11, the eye width/visibility adjusting operation when the power is turned on is described. When the power is turned on in the controller 6 (Step S101), the CPU 221 activates the eye width/visibility adjusting picture display program stored in the area 418 in the program memory 41 (refer to FIG. 6) and executes it. As a result, eye width/visibility adjusting pictures as shown in FIGS. 13(a) and (b) are displayed on the display systems on both sides in the image display unit 21. (Step S102) More specifically, the figure A is displayed in the upper left corner, the figure B is displayed in the lower right corner, and the figure E is displayed in the center on the screen in the left display system, as shown in FIG. 13(a). The figure C is displayed in the lower left corner, the figure D is displayed in the upper right corner and the figure E is displayed in the center on the screen in the right display system, as shown in FIG. 13(b).

Now, if the areas for displaying the figures A to D for eye width adjustment are too large, the figures on the left and right sides may be fused. Accordingly, small display areas of about 16 dots×16 dots are allotted to the figures A to D. On the other hand, a large display area of about 176 dots×176 dots is allotted to the figure E for visibility adjustment, for example, because the visibility adjustment requires clear visual recognition of displayed contents. The figures A–E E may be formed of any of letters, signs, designs, or pictures. Usually, simple figures, such as circles, squares, triangles, etc. will be used as the figures A–D which are required only to be recognized as marks. On the other hand, as the figure E, part of the contents of the game may be displayed to relieve tedium in the eye width/visibility adjustment. However, the displayed objects must be static and have no parallax. This is due to the fact that displaying objects with parallax makes the eye width adjustment difficult and makes focusing difficult, and makes the eyes tired because the eyes have nature of fusing images seen through the right eye and the left eye. Displaying moving objects will also make the eye width adjustment and focusing difficult and make the eyes tired because of the nature of the eyes of paying more attention to moving objects than to stationary objects.

Now, if the space set between the left and right display systems is too narrow as compared with the eye width of a user, the eyes of the user will not see the figures A and D. (Refer to FIG. 13(c)). Conversely, if the space set between the left and right display systems is too broad as compared with the eye width of the user, the eyes of the user will not see the figures B and C. (Refer to FIG. 13(d)) Accordingly, the user will turn the eye width adjusting lever 201 in FIG. 1 to adjust the space set between the left and right display systems. (Step S103) That is to say, when the eye width adjusting lever 201 is turned, the adjusting mechanism (not shown) in the image display unit 21 operates to integrally move the LED array 214L, the lens 216L and the mirror 217L in the left display system in the left and right direction and to move the LED array 214R, the lens 216R and the mirror 217R together in the opposite direction in the right display system. As a result, the space set between the left and the right display systems changes. When the space set between the left and right display systems becomes ideal for the eye width of the user, the user can visually recognize all the figures A–D, as shown in FIG. 13(e).

Next, the user slides the visibility adjusting lever 202 in FIG. 1 to adjust the visibility. (Step S104) When the visibility adjusting lever 202 is slid, the lens 217L and the lens 217R move independently of other components in the left and right display systems. This changes the space between the LED array 214L and the lens 217L and the space between the LED array 214R and the lens 217R by the same amount, respectively. Accordingly, the depth of focus of the enlarged virtual images in the eyeballs of the user changes. Then, when the enlarged virtual image forms an image on the retina, the figure E is in focus and the visibility adjustment is finished.

If the eye width adjustment is deranged as a result of the visibility adjustment, the eye width adjustment is made again in the Step 103. When the eye width and visibility adjustment is finished by repeating the Steps S103 and S104 (Step S105), the user pushes a start button (not shown) provided on the controller 6 (Step S106) As a result, the CPU 221 activates the game program stored in the area 411 in the program memory 41 to start the game operation. (Step S107)

Next, referring to FIG. 12, the eye width/visibility adjusting operation in pause (temporary stop) is described. In this embodiment, pushing the start button on the controller 6 after the game is started instructs the CPU 221 pause. (Step S201) Following operations, i.e. the steps S202–S207 are the same as the steps S102–S107 in FIG. 11, and a description thereof is not repeated here. In the Step S207, however, the game is not newly started as in the Step S107, but the game is restarted from the state just before the pause.

Figure 14:
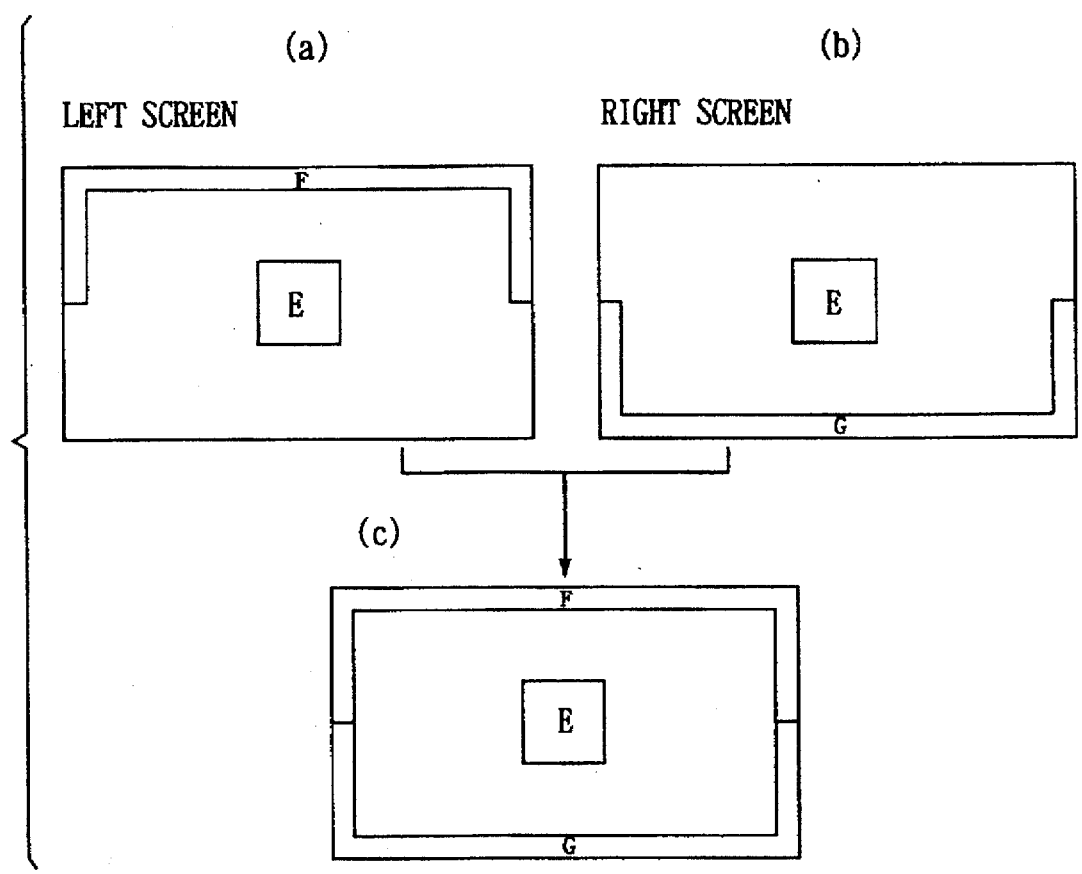
FIG. 14 is a diagram showing another example of the eye width/visibility adjusting picture.
Figure 15:
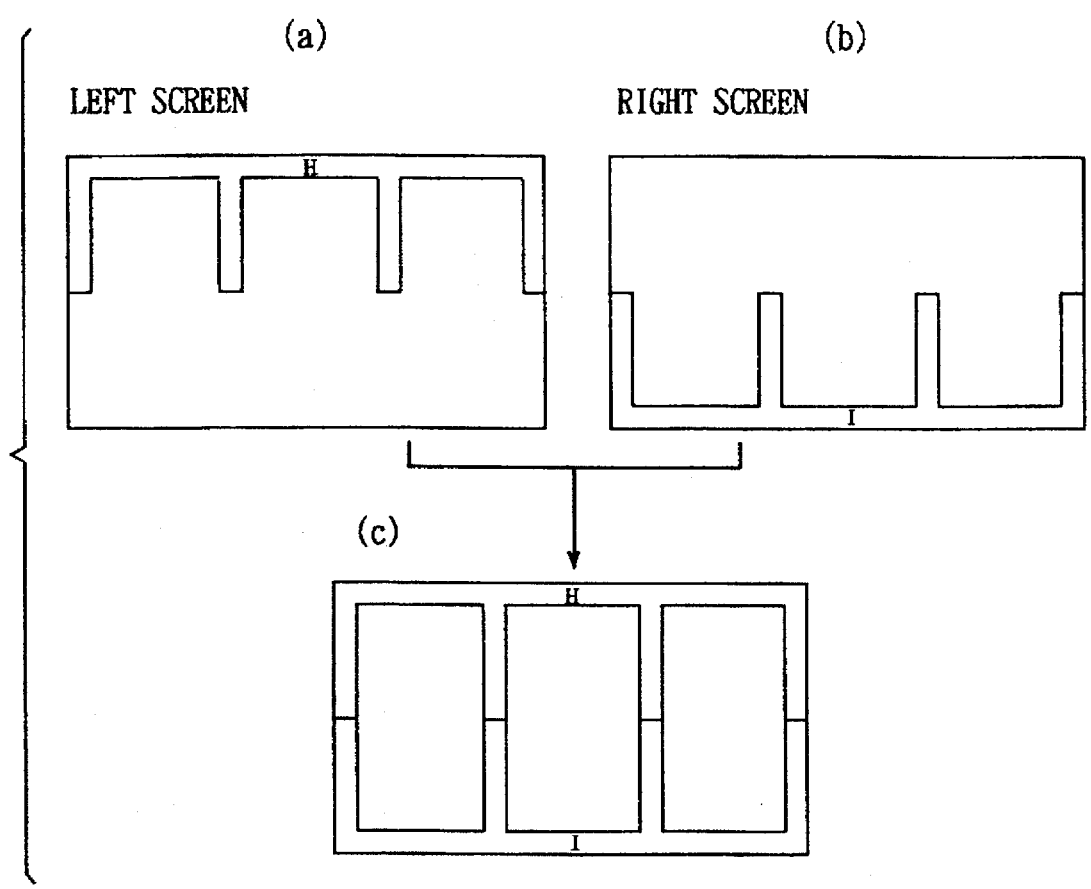
FIG. 15 is a diagram showing still another example of the eye width/visibility adjusting picture.
Figure 16:
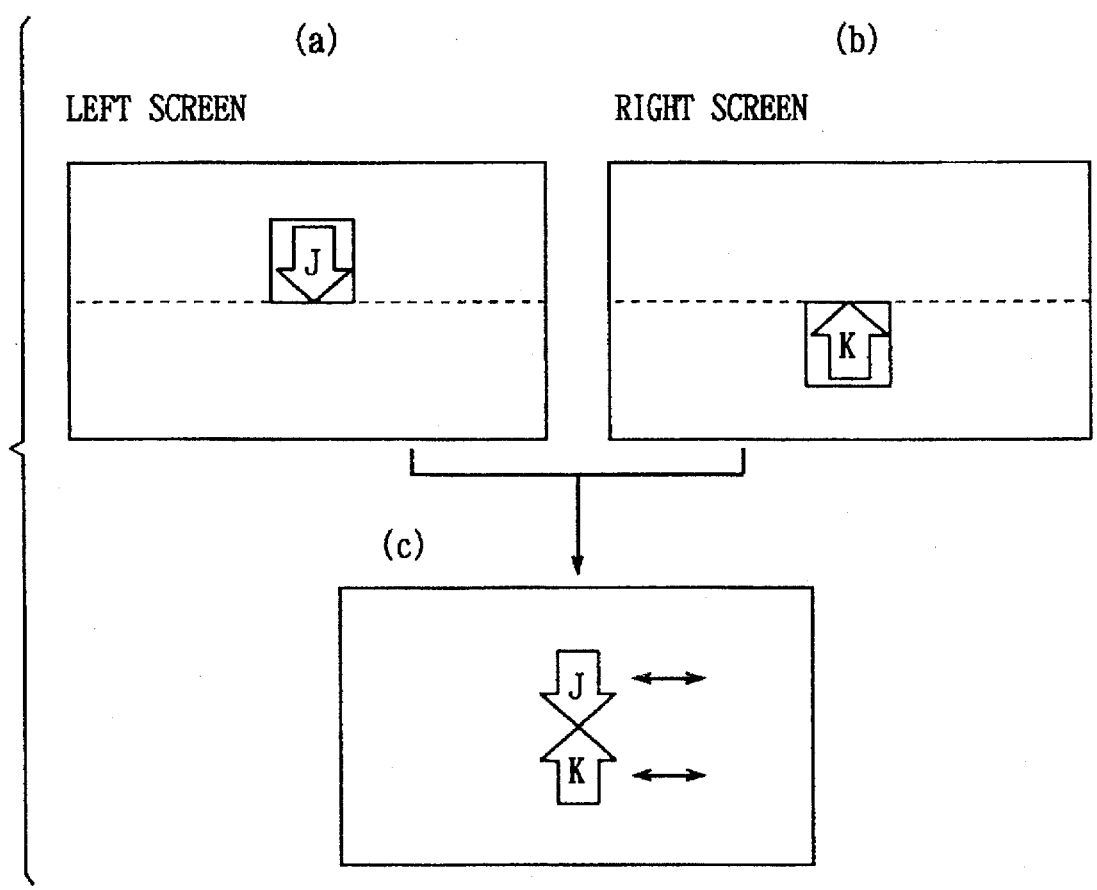
FIG. 16 is a diagram showing still another example of the eye width/visibility adjusting picture.

FIG. 14–FIG. 16 show some other examples of the eye width/visibility adjusting pictures. In the example of FIG. 14, a frame-like figure F is displayed in the upper half in the left screen (refer to FIG. 14(a)), a frame-like figure G is displayed in the lower half on the right screen (refer to FIG. 14(b)), and the figure E is displayed in the center on the left and right screens. When the eye width adjustment is completed, the eyes of the user will see as if the periphery of the screen is surrounded by a window formed of a combination of the figures F and G. (Refer to FIG. 14(c)) If the space between the left and right display systems is too narrow or too broad as compared with the eye width of the user, it looks as if parts of the window discontinue on the left and right sides. The adjustment of the visibility is achieved by using the figure E in the center in the same way as that in the above-described embodiment.

In the example of FIG. 15, the comb-like figure H is displayed in the upper half on the left screen (refer to FIG. 15(a)), and a comb-like figure I is displayed in the lower half on the right screen (refer to FIG. 15(b)). When the eye width adjustment is completed, the eyes of the user will see the screen as if the screen is divided into three with a lattice formed of a combination of the figures H and I. (Refer to FIG. 15(c)) If the space between the left and right display systems is too small or large as compared with the eye width of the user, the lattice looks as if it discontinues on the left and right sides. The visibility is adjusted according as the figures H and I are in focus or not. That is to say, in the example of FIG. 15, the figures for the eye width adjustment are also used as figures for the visibility adjustment.

In the example of FIG. 16, a downward arrow J is displayed at the center in the upper half on the left screen (refer to FIG. 16(a)), and an upward arrow K is displayed in the lower half on the right screen (refer to FIG. 16(b)). When the eye width adjustment is finished, the eyes of the user will see as if the end of the downward arrow J and the end of the upward arrow K meet. (Refer to FIG. 16(c)) If the space between the left and right display systems is too small or too large as compared with the eye width of the user, the end of the downward arrow J and the end of the upward arrow K look as if they do not meet. The visibility is adjusted according as the arrows J and K are in focus or not. That is to say, in this example of FIG. 16, the figures for the eye width adjustment are also used as figures for the visibility adjustment.

Figure 17:
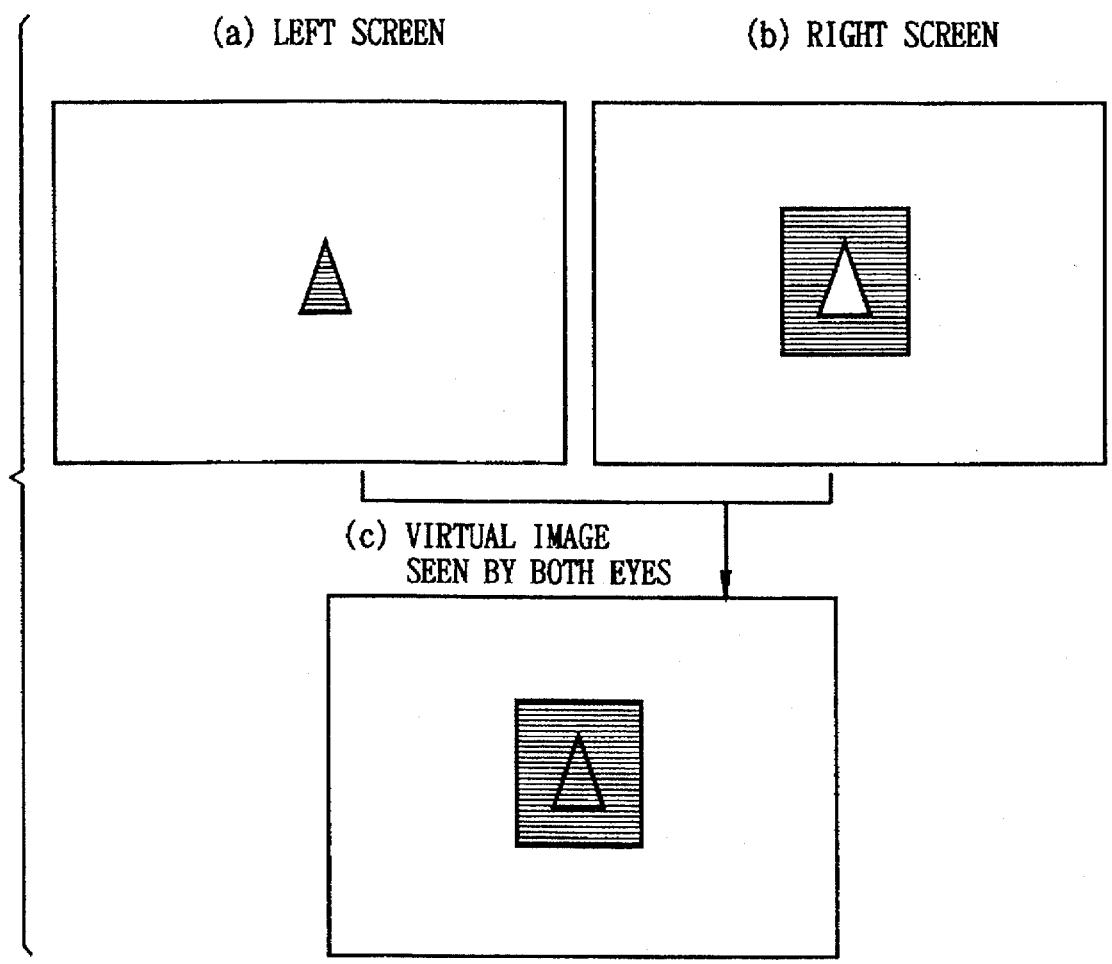
FIG. 17 is a diagram showing still another example of the eye width/visibility adjusting picture.

In the example of FIG. 17, a relatively small triangle shaded inside is displayed almost in the center on the left screen (refer to FIG. 17(a)), and a relatively large square shaded inside and having a transparent portion shaped identically to the triangle displayed on the left screen in its center is displayed on the right screen (refer to FIG. 17(b)). When the eye width adjustment is completed, the eyes of the user see as if the triangle on the left screen and the triangle in the square on the right screen match each other and there is no transparent portion in the square. (Refer to FIG. 17(c)) If the space between the left and right display systems is too small or large as compared with the eye width of the user, the transparent portion will be visible in the square. The visibility is adjusted according as whether the triangles and the square are in focus or not. That is to say, in the example of FIG. 17, the figures for the eye width adjustment are also used as figures for the visibility adjustment.

Figure 18:
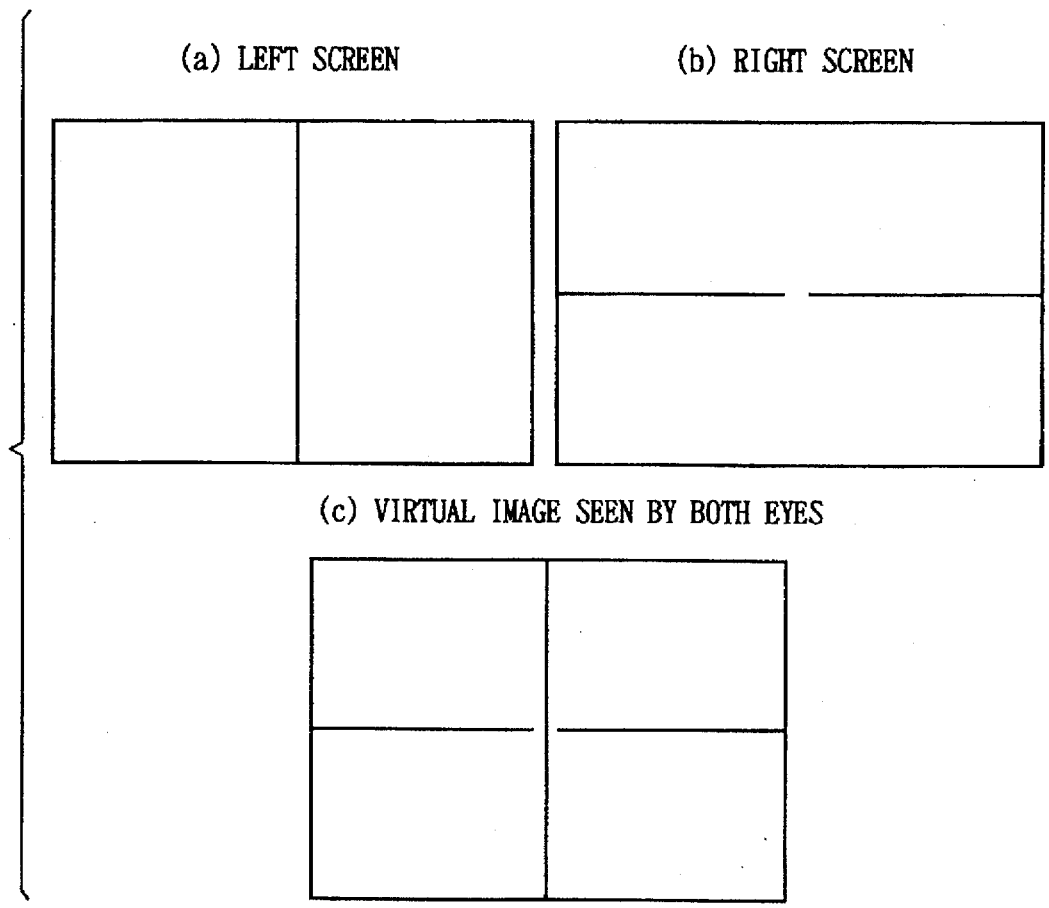
FIG. 18 is a diagram showing still another example of the eye width/visibility adjusting picture.

In the example in FIG. 18, a vertical line with a lateral width of 1 dot is displayed in the center on the left screen (refer to FIG. 18(a)), and a horizontal line with a longitudinal width of 1 dot and with a break of 6 dots in the center of the line (in the center of the screen) is displayed on the right screen (refer to FIG. 18(b)). After the eye width adjustment is completed, the vertical line is seen in the center of the break of the horizontal line. (Refer to FIG. 18(c)) That is to say, it looks as if the horizontal line discontinues for 5 dots on the vertical line, respectively. If the space between the left and right display systems is too small or large as compared with the eye width of the user, the vertical line will not be displayed in the center of the break of the horizontal line and the break width on the left of the vertical line and the break width on the right thereof will not look equal, or it will look as if the vertical line and the horizontal line intersect each other. The visibility is adjusted according as the vertical line or the horizontal line is in focus or not. That is to say, in the example of FIG. 17, the figures for the eye width adjustment are also used as figures for the visibility adjustment.

Although the eye width/visibility adjusting picture display program is stored in the program memory 41 in the program cartridge in the above-described embodiment, an eye width/visibility adjusting picture display program memory 229 (refer to FIG. 2) may be provided in the body device 2 and the eye width/visibility adjusting picture display program may be stored in this eye width/visibility adjusting picture display program memory 229.

Figure 19:
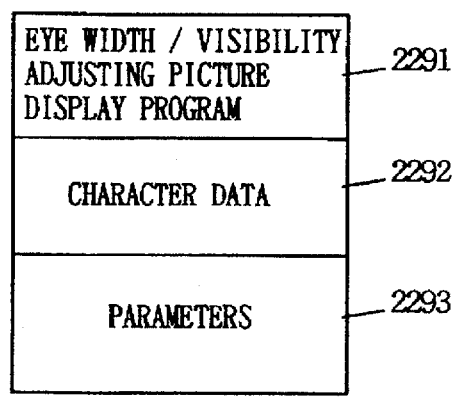
FIG. 19 is a diagram showing a memory map of an eye width/visibility adjusting picture displaying program memory provided in the body device.

FIG. 19 schematically shows an example of structure of the above-mentioned eye width/visibility adjusting picture display program memory 229. In FIG. 19, the eye width/ visibility adjusting picture display program memory 229 includes areas 2291-2293. The eye width/visibility adjusting picture display program is stored in the area 2291. Character data necessary to display the eye width/visibility adjusting pictures are stored in the area 2292. Various parameters necessary to display the eye width/visibility adjusting pictures are stored in the area 2293. In the embodiment described above, the display data of the eye width/ visibility adjusting pictures are generated by combining the character data stored in the character RAM 2246, i.e., the character data transferred from the program cartridge 4. Accordingly, as the program cartridge 4 is exchanged, the eye width/visibility adjusting pictures can be changed. On the other hand, in the structure of FIG. 19, display data for the eye width/visibility adjusting pictures are generated on the basis of the character data stored in the area 2292. Accordingly, the eye width/visibility adjusting pictures are always fixed. Needless to say, in the same way as the embodiment above, the eye width/visibility adjusting pictures may be displayed by using character data transferred from the program cartridge 4. In this case, the eye width/ visibility adjusting pictures can be changed as the program cartridge 4 is exchanged, and the memory capacity of the program memory can be reduced to reduce the cost of the memory cartridge.

Although the above embodiment has been described as an electronic game device, the image display device of the present invention is not restricted to the same, but can be widely applied to other devices with display, such as training devices, educational equipments, guiding devices, etc.

Although the embodiment above is constructed as a device displaying stereoscopic images provided with parallax, the present invention may be structured as a device for displaying two-dimensional (planar) images without parallax.

While the invention has been described in detail, the foregoing description is in all aspects illustrative and not restrictive. It is understood that numerous other modifications and variations can be devised without departing from the scope of the invention.

We claim:

1. An image display device for independently displaying images to both eyes of a user, comprising;
    a pair of display units being disposed in use on the left and the right respectively adjacent to the left and right eyes of the user;
    a width adjusting mechanism adjustably holding a space between said pair of display units;
    eye width adjusting picture displaying program storage locations for storing a program for displaying an eye width adjusting picture;
    eye width adjusting picture displaying image data storage locations for storing image data for displaying the eye width adjusting picture; and
    a processor for executing the program stored in said eye width adjusting picture displaying program storage locations and for accessing image data stored in said eye width adjusting picture displaying image data storage locations to cause said left and right display units to display said eye width adjusting picture,
    wherein the space between said left and right display units may be adjusted by operating said width adjusting mechanism on the basis of a visually recognized state of the eye width adjusting picture displayed in said left and right display units.

2. The image display device according to claim 1, wherein said processor executes the program stored in said eye width adjusting picture displaying program storage location substantially immediately after the power is turned on.

3. An image display device for independently displaying images to both eyes of a user, comprising;
    a pair of display units being disposed in use on the left and the right respectively adjacent to the left and right eyes of the user;
    a width adjusting mechanism adjustably holding a space between said pair of display units;
    eye width adjusting picture displaying program storage locations for storing a program for displaying an eye width adjusting picture;
    eye width adjusting picture displaying image data storage locations for storing image data for displaying the eye width adjusting picture; and
    a processor for executing the program stored in said eye width adjusting picture displaying program storage locations and for accessing image data stored in said eye width adjusting picture displaying image data storage locations to cause said left and right display units to display said eye width adjusting picture,
    wherein the space between said left and right display units may be adjusted by operating said width adjusting mechanism on the basis of a visually recognized state of the eye width adjusting picture displayed in said left and right display units, wherein
    said eye width adjusting picture displayed in said left display unit includes a first figure having its displayed area at least in the vicinity of the left end in the picture and a second figure having its display area at least in the vicinity of the right end in the picture,
    said eye width adjusting picture displayed in said right display unit includes a third figure having its display area at least in the vicinity of the left end in the picture and a fourth figure having its display area at least in the vicinity of the right end in the picture,
    said first and third figures being disposed in positions where they do not overlap each other,
    said second and fourth figures being disposed in positions where thy do not overlap each other,
    wherein the space between said left and right display units may be adjusted by operating said eye width adjusting mechanism so that all of said first through fourth figures are visible when the eye width adjusting picture displayed in said left and right display units is seen through both eyes.

4. An image display device for independently displaying images to both eyes of a user, comprising;
    a pair of display units being disposed in use on the left and the right respectively adjacent to the left and right eyes of the user;
    a width adjusting mechanism adjustably holding a space between said pair of display units;
    eye width adjusting picture displaying program storage locations for storing a program for displaying an eye width adjusting picture;
    eye width adjusting picture displaying image data storage locations for storing image data for displaying the eye width adjusting picture; and
    a processor for executing the program stored in said eye width adjusting picture displaying program storage locations and for accessing image data stored in said eye width adjusting picture displaying image data storage locations to cause said left and right display units to display said eye width adjusting picture, wherein the space between said left and right display units may be adjusted by operating said width adjusting mechanism on the basis of a visually recognized state of the eye width adjusting picture displayed in said left and right display units, wherein said eye width adjusting picture displayed in said left display unit includes a first figure having its display area at least in the vicinity of the center in the picture, and said eye width adjusting picture displayed in said right display unit includes a second figure having its display area at least in the vicinity of the center in the picture, said first and second figures being disposed in positions where they do not overlap each other, wherein the space between said left and right units may be adjusted by operating said eye width adjusting mechanism so that positions of said first and second figures in the left and right directions coincide with each other when the eye width adjusting picture displayed in said left and right display units is seen through both eyes.

5. An image display device for independently displaying images to both eyes of a user, comprising;
- a pair of display units being disposed in use on the left and the right respectively adjacent to the left and right eyes of the user;
- a width adjusting mechanism adjustably holding a space between said pair of display units;
- eye width adjusting picture displaying program storage locations for storing a program for displaying an eye width adjusting picture;
- eye width adjusting picture displaying image data storage locations for storing image data for displaying the eye width adjusting picture; and
- a processor for executing the program stored in said eye width adjusting picture displaying program storage locations and for accessing image data stored in said eye width adjusting picture displaying image data storage locations to cause said left and right display units to display said eye width adjusting picture, wherein the space between said left and right display units may be adjusted by operating said width adjusting mechanism on the basis of a visually recognized state of the eye width adjusting picture displayed in said left and right display units, wherein said left and right display units each comprise,
- a light emitting element array in which a plurality of light emitting elements are regularly arranged along a first direction,
- display driving circuitry for providing display data sequentially for each column to said light emitting element array and selectively display-driving each light emitting element,
- a lens system for forming an enlarged virtual image of said light emitting element array,
- a mirror for reflecting the enlarged virtual image formed by said lens system to enable visual recognition by eyes of a user, and
- mirror driving circuitry for causing said mirror to reciprocatively move in a certain angle range to scan said enlarged virtual image in a second direction almost perpendicular to said first direction to project a two-dimensional planar image to the eye of the user.

6. An image display system having an image display device body for displaying an image on the basis of given program data and image data and a program cartridge attachably/detachably connected to the image display device body, wherein said program cartridge comprises,
- eye width adjusting picture displaying program storage locations for storing in a non-volatile manner a program for displaying an eye width adjusting picture; and
- eye width adjusting picture displaying image data storage locations for storing in a non-volatile manner image data for displaying the eye width adjusting picture; and said image display device body comprises,
- a pair of display units being disposed in use on the left and the right respectively adjacent to the left and right eyes of a user;
- a width adjusting mechanism adjustably holding a space between said pair of display units; and
- a processor for executing the program stored in said eye width adjusting picture displaying program storage locations and for accessing image data stored in said eye width adjusting picture displaying image data storage locations to cause said left and right display units to display said eye width adjusting picture, wherein the space between said left and right display units may be adjusted by operating said width adjusting mechanism on the basis of a visually recognized state of the eye width adjusting picture displayed in said left and right display units.

7. A program cartridge attachably/detachably connected to an image display processing device body comprising left and right display units being disposed in use respectively adjacent to the left and right eyes of a user, comprising,
- eye width adjusting picture displaying program storage locations for storing in a non-volatile manner a program for displaying an eye width adjusting picture; and
- eye width adjusting picture displaying image data storage locations for storing in a non-volatile manner image data for displaying the eye width adjusting picture;

wherein said image display processing device body executes the program stored in said eye width adjusting picture displaying program storage locations and accesses image data stored in said eye width adjusting picture displaying image data storage locations to cause said left and right display units to display said eye width adjusting picture.

* * * * *